Jan. 27, 1931.  B. H. MOSSINGHOFF  1,790,627
TRANSMISSION CONTROL
Filed Jan. 10, 1925  2 Sheets-Sheet 1
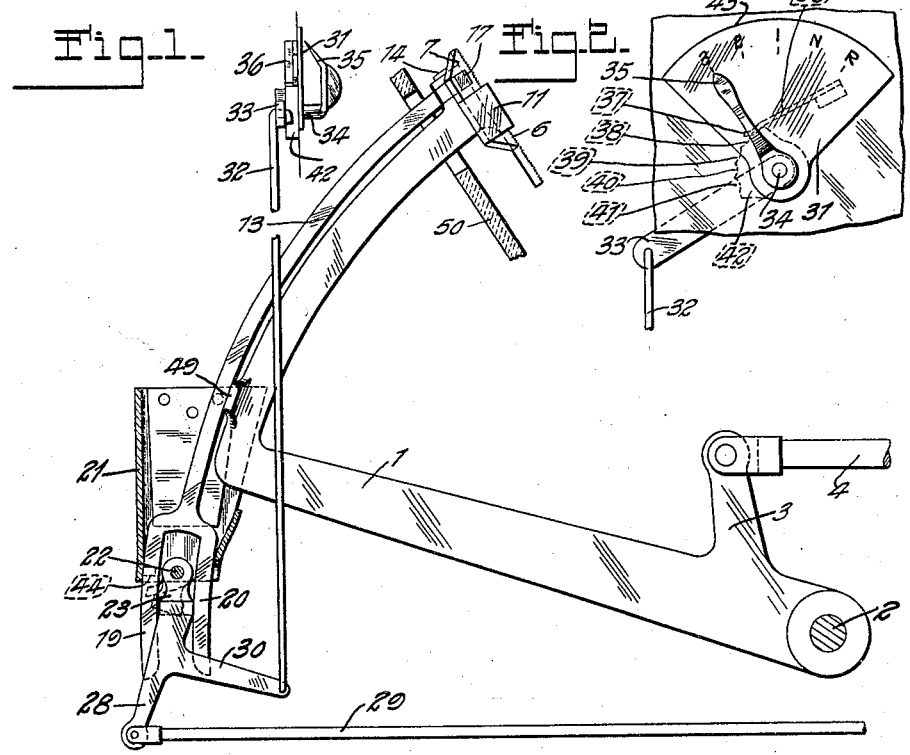
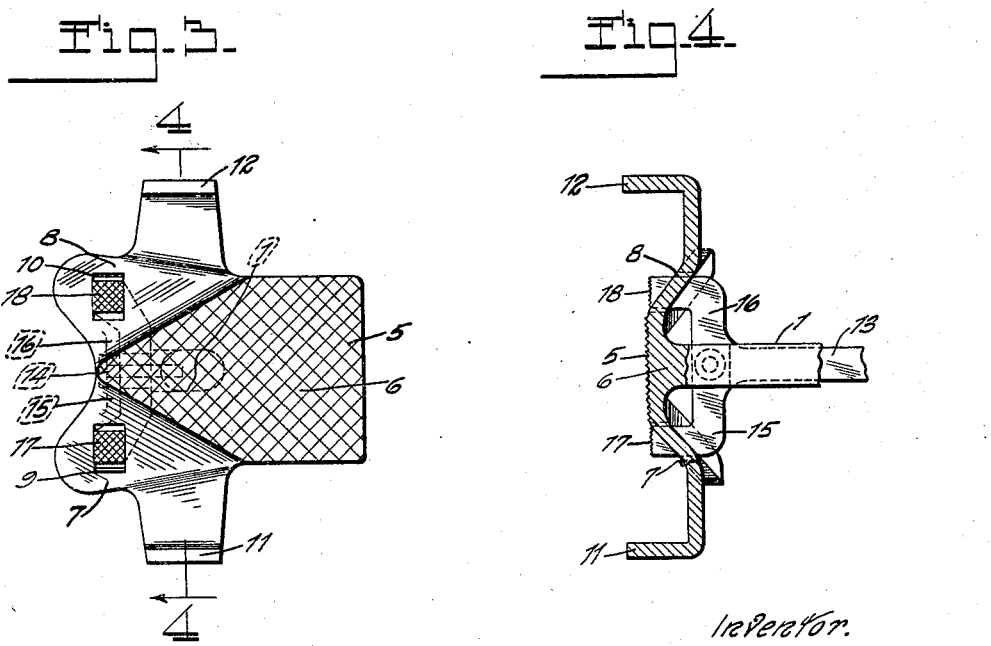
Inventor.
BERNARD H. MOSSINGHOFF.
By Cornwall, Bedell & James
ATTORNEYS.

Jan. 27, 1931. B. H. MOSSINGHOFF 1,790,627
TRANSMISSION CONTROL
Filed Jan. 10, 1925 2 Sheets-Sheet 2
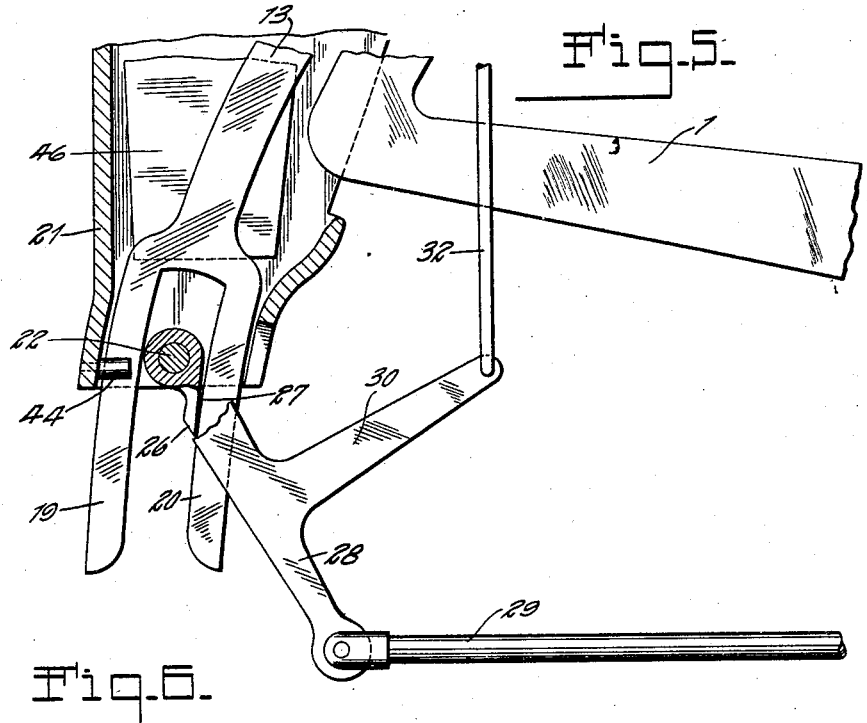
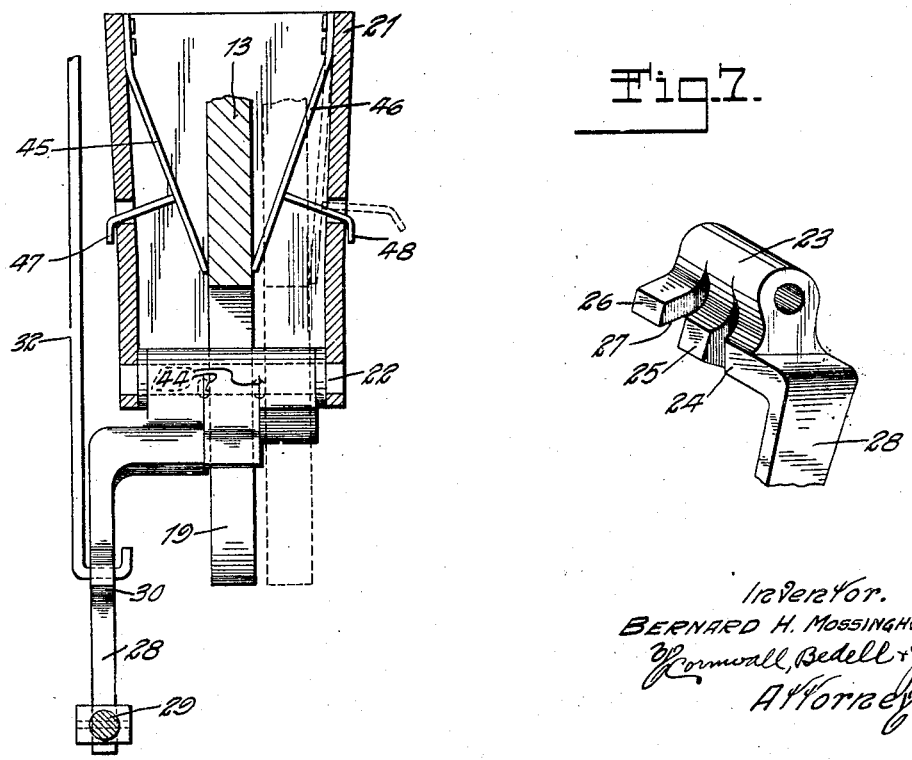
Inventor.
BERNARD H. MOSSINGHOFF.
Cornwall, Bedell + James
Attorneys.

Patented Jan. 27, 1931

1,790,627

UNITED STATES PATENT OFFICE

BERNARD H. MOSSINGHOFF, OF ST. LOUIS, MISSOURI, ASSIGNOR, BY MESNE ASSIGNMENTS, TO PROGRESSIVE MOTOR DEVICES CORPORATION, OF CHICAGO, ILLINOIS, A CORPORATION OF ILLINOIS

TRANSMISSION CONTROL

Application filed January 10, 1925. Serial No. 1,528.

My invention relates to new and useful improvements in speed selectors and transmission controls of the type illustrated and described in Patent No. 1,486,447, issued to me March 11, 1924, and in my copending application Serial No. 1,527, filed January 10, 1925, for transmission control.

My invention is also applicable as an improved controlling means for the mechanical gear shifting device manufactured by the Cutler-Hammer Manufacturing Company of Milwaukee, Wisconsin, and applied to the automobile manufactured by the Apperson Motor Car Company.

The principal objects of my invention are to provide a pedal speed-change selecting device that is simple, positive, convenient, and practical in operation and construction and comparatively cheap to manufacture; to provide a single operation speed-change and clutch control whereby movement of the clutch pedal operates the clutch and selects and shifts the gears; to provide a simple foot pedal, the bodily depression of which positions the parts for the selection of one of the speed ratios; to provide in a combined clutch and speed-selecting pedal, of the type wherein a speed ratio is disengaged and a new speed ratio engaged during the movement of the pedal, means to allow absolute freedom of selection until the time for positioning the parts for the engagement of the new speed ratio; to provide a combined clutch and speed selecting pedal that will disengage the engaged and engage a new speed on the same positive forward stroke of the pedal if the transmission is so designed, or permit the engagement of the new speed upon release of the pedal, if necessary; to provide a mechanism which will permit freedom of selection after the initial depression of the pedal, thus enabling a change of intention on the part of the operator; to provide manual control for certain transmission positions; and to provide an indicator to show at all times the position of the selector mechanism and consequently the position of the transmission.

With these and other objects in view, my invention consists in certain novel features of construction and arrangement of parts, hereinafter more fully described and claimed, and illustrated in the accompanying drawings, in which—

Figure 1 is a side elevational view of my improved speed selection means.

Figure 2 is an elevation of the auxiliary manual control and indicator.

Figure 3 is a plan view of the pedal face.

Figure 4 is a section taken on line 4—4 of Figure 3.

Figure 5 is an enlarged side elevation of the selection mechanism showing the parts in position to direct a certain speed engagement.

Figure 6 is an end elevation of the selector mechanism.

Figure 7 is a perspective view of the cam.

The numeral 1 in the drawings is a clutch pedal fixedly mounted on a clutch operating shaft 2. Arm 3 is an integral part of the clutch pedal 1 and produces longitudinal motion in rod 4 with movement of the clutch pedal. The longitudinal motion of rod 4 is utilized to disengage and engage variable power transmission elements by means of mechanism, such as the Cutler Hammer mechanical gear shift or the gear change mechanism disclosed in my Patent No. 1,486,447, issued March 11, 1924, in which latter case a cam would preferably be substituted for the arm 3. Pedal face 5 is a rigid member, being grilled to prevent the operator's foot from slipping.

The main portion 6 of the pedal face 5 is flat and preferably in the form of a pentagon. Two auxiliary faces 7 and 8 are formed with, but inclined down from, the main body portion 6 at the upper right and left edges, respectively. Openings 9 and 10 are provided in the inclined portions 7 and 8 of the pedal face.

Upstanding guard lugs 11 and 12 are provided on either side of the pedal face to keep the operator's foot from slipping off the pedal when the foot is directed against one of the inclined portions. Selector 13 is pivotally mounted to the free end of pedal 1 by means of pin 14. The upper end of the selector is bifurcated, forming two members 15 and 16 extending in a plane at right angles to the axis of pin 14. Members 15 and 16 terminate in upstanding lugs 17 and 18 which extend through the openings 9 and 10 in the inclined portions of the pedal face and in turn terminate in a plane lower than that of the main body portion 6 of the pedal face. The lower end of the selector is also bifurcated to form two spaced parallel members 19 and 20 whose longitudinal axes are parallel to the axis of the main body portion of selector 13. 21 is a fixed housing and guide substantially rectangular in cross section open at the top and bottom and slotted to allow movement of pedal 1. This housing preferably tapers from top to bottom where a transverse shaft or pin 22 is mounted.

The space between the front and rear portions of the bottom edges of this housing is just sufficient to clear the parallel members 19 and 20 of selector 13. A compound cam 23 is loosely mounted on shaft 22. This cam is provided with two double face portions 24 and 25 and a single face portion. Each of the sides 26 and 27 of the single face portion provides a different operation. An arm 28 operates and is preferably formed with cam 23 as a projection of cam portion 24. A directional rod 29 is connected to arm 28. The purpose of rod 29 is to arrange speed change mechanism (not shown) so that effort transmitted through rod 4 will change the transmission of power to neutral or to the ratio directed by the operator through rod 29.

Arm 30 projects from arm 28 at right angles thereto and is linked to an auxiliary control and indicator 31 by rod 32 and arm 33. Arm 33 is fixed on shaft 34, as is the indicator finger 35. The indicator 31 is located within sight and easy reach of the operator; for example, in the case of an automobile, it would be preferably located on the instrument board. A blade spring 36 is mounted on the back of the indicator to engage notches 37, 38, 39, 40 and 41 in block 42. The block 42 is fixed to shaft 34 to rotate therewith. The engagement of the blade spring in the notches may be felt by the operator during the use of the indicator as a manual control and enables the operator to feel its position at night if the dial 43 is not illuminated.

Pins 44 are fixed near the lower edge of the inner front end of housing 21 to prevent jamming of the mechanism by the engagement of more than one portion of the cam by the members 19 and 20 of selector 13. The blade springs 45 and 46 are riveted to the inner side of the housing near the top and tensioned so as to bend inwardly away from the housing. Their inward movement is limited by hooks 47 and 48 which are fixed to the springs and extend through openings in the housing. These blade springs are substantially the width of the housing throughout their length so that they direct and align the members 19 and 20 of the selector during their travel into the proper position longitudinally for the engagement of any of the cam surfaces.

A guide 49 is provided on pedal 1 to prevent the selector from moving rearwardly in case of looseness or wear at pin 14. This guide is flared so that it is substantially wider than the pedal arm. The floor board 50 limits both the upward and downward movement of pedal 1 so that the selector will not strike against the body of the cam on its downward travel, and unduly strain or bend it, and so that the members 19 and 20 of the selector are lower than the top of the housing 21 at the upward limit of its movement.

To operate my improved speed selector, the driver before starting the engine or other motive power which provides the drive to the transmission, directs the manual indicator finger 35 to the letter N on the dial 43. He then places his foot upon the pedal face so as to contact with button 17 and depresses the pedal. The resultant pressure upon button 17, which can be accentuated if desired by correspondingly slightly tilting the foot, pivots the selector 13 upon its pin 14 and shifts the forked members 19 and 20 to the extreme righthand side of the housing 21. (See position shown in dotted lines in Figure 6.) The cam 23 has been positioned by linkage with the manual indicator so that the surfaces 26 and 27 will be between the forked members 19 and 20 of the selector and not contact with either one of these members.

Upon depression of the clutch pedal, the blade spring 46 is compressed by the selector and acts to longitudinally align the members 19 and 20 of the selector so that they will pass the cam in a position at right angles to the axis of the cam. During this neutralizing movement, there is no operative contact between the cam 23 and the selector. The selector merely passes idly by without contacting with either of the surfaces 26 and 27 of the cam. In this position, the directional rod 29 is not operated by the clutch pedal and selector member 13 but only by the manual indicator. The shifting rod 4 acting with the clutch pedal 1 will now produce the neutral position directed by the rod 29 upon depression of the clutch pedal.

To direct the parts for the engagement of the first forward speed, the indicator finger 35 must be moved to any of the positions on the dial marked 1, 2 and 3. The operator's foot again contacts with button 17 which positions the indicator at the extreme righthand side of the housing 21. Upon depression of the clutch pedal, the selector 13 moving therewith will contact with the cam and rotate the cam in an anti-clockwise direction until the surface 26 has been moved sufficiently to ride along the inner edge of the member 19 of the selector. When the cam has been turned to this position, the rod 29 attains a position that will direct the transmission mechanism for the engagement of the first forward speed upon the operation of rod 4. The effective operating movement of rod 4 is preferably produced during the last portion of the forward or downward movement of the clutch pedal so that the engagement of the transmission elements is positive. This is achieved without providing lost motion by utilizing a cam, the raised portion of which is brought to bear at the desired time.

To obtain the second forward speed, the operator's foot is placed directly upon the pedal without contact with either of the buttons 17 or 18. The pedal is then depressed. The blade springs 45 and 46 direct the members 19 and 20 of selector 13 over the central portion of the cam so that the faces 25 will ride against the inner faces of these members 19 and 20. The cam will be rotated by the selector until it is so positioned that the forked members can pass and thus produce a different position in the rod 29 which directs the speed change mechanism for the engagement of the second forward speed upon the operative action of the rod 4.

To obtain the third forward speed, the button 18 is contacted with by the operator's foot, shifting the selector to the left side of the housing 21 and depressing spring 45. Upon depression of the clutch pedal, the two members 19 and 20 of the selector are again aligned in a position at right angles to the axis of the cam. The initial contact of these two members with the cam tends to rotate the cam so that the members 19 and 20 may pass by the faces 24. The rotation of the cam provides a new position in rod 29 which directs the transmission elements for the engagement of the third forward speed upon the operative movement of the rod 4.

To obtain the reverse speed, the manual indicator must be moved to point to the letter R on dial 43. This movement alone positions the cam and shifts the rod 29 for reverse. The operator's foot is brought into contact with the button 17 to shift the selector to the right side of housing 21. The relative positioning of the selector and the cam are now such that upon depression of the pedal, part 20 of the selector will slide idly over surface 27 of the cam (see Figure 5) without rotating the same; said depression of the pedal being necessary in order to accomplish the selected speed through shifting of rod 4.

It is to be understood that after the direction of neutral position or reverse speed, it is not essential to manually move the indicator in order to direct the engagement of the first speed. This may also be done by rotating the cam 23 by contact with either of the double face portions 24 and 25. When this is done and it is desired to enter first speed, the clutch pedal is not fully released, but only to a point where the member 19 of the selector is operatively free from the pins 44 so that it may be directed over the single face portion of the cam. With the parts thus positioned, the operator may contact the button 17 and redepress the pedal to direct the engagement of first speed. However, it is necessary to use the manual indicator for the direction of reverse speed and the positive neutral. The notches 37, 38, 39, 40 and 41 in block 42 are spaced to provide set positions for the rod 29 by the engagement of blade spring 34 therein, thus, in cooperation with the indicator providing also manual selection means, should such be desired.

It will be noted, furthermore that it is possible by the bodily removal of the selector member 13 to operate my device purely as a manual selector. In this case all of the notches in block 42 are utilized to determine the correct position for rod 29.

It will be readily understood that minor changes in the form and construction of the various parts of my improved transmission control may be made and substituted for those herein shown and described, without departing from the spirit of my invention, as expressed in the following claims.

I claim:

1. In a driving ratio change device for automobiles, a foot operated clutch controller having clutch engaged and disengaged positions, ratio selector means arranged for positioning selectively by the downward pressure of the foot operating said controller, further selection means cooperating with said selector means and arranged to be freely positionable during the effectual clutch disengaging movement of said controller, and pressure means urging said selection means automatically into another position of definite ratio selection.

2. In a motor vehicle, a freely selective speed change selecting device for a plurality of speed ratios and including pedal means having selection controlling means and pedal controlling means thereon, means operable by said pedal means to effect complete speed selecting by its substantially forward movement, and means whereby substantially the same directional movement of the foot relative to said selection controlling means and said pedal controlling means will completely select for any of said plurality of speeds and operate said pedal.

3. In a driving ratio selecting device for automobiles, a clutch pedal, ratio change selecting mechanism constructed for complete ratio change selecting operation by the forward stroke of said pedal, ratio selector means associated with and mounted in respect to said pedal as to be operable by the foot when operating said pedal, a plurality of foot engageable surfaces on said selector means and arranged for a diversity of selective foot engagements for diverse ratio selecting, and means constructed so that the solely forward pressure of the foot selectively on said surfaces moves said means selectively to determine the speed selected and further pressure thereagainst in the same direction moving said pedal to disengage the clutch and effect a complete selection.

4. In a driving ratio change device for automobiles, a pedal member controlling a normal function of automobile operations, a foot contact surface on said member for said operation, a ratio determining device pedally operable with said member, including a selector member, a plurality of foot pressure surfaces on said selector member for a corresponding plurality of ratio selective positions, further selection means cooperating with said selector means, and pressure means urging said selector member automatically into a definite position of ratio selection when the foot functions on said first named contact surface.

5. In a driving ratio change device for automobiles, a pedal controller, a foot engageable surface for said controller, and ratio selection mechanism, including a single foot engageable selector member on said controller having a single selector means movable relative to said surface through foot engagement into a plurality of definite ratio selective positions, and pressure means urging said means automatically into another definite ratio selection position.

6. In a driving ratio change device for an automobile, a pedal controller, and a ratio selection mechanism to select the ratio change, comprising selection initiating means movable with said controller, normally independent selection transmitting means operable by said first means, the movement of said controller moving said initiating means to cooperate with said selection transmitting means to control a definite ratio change.

7. In a driving ratio change device for automobiles, a ratio selection mechanism including a pedal, a primary selection means selectively operable by the foot operating said pedal, and selectively settable secondary selection means operated by said primary selection means upon movement of said pedal to effect the ratio selection according to the position of said primary means and means cooperating with said pedal to effect the ratio change after the setting of the secondary selection means.

8. In a device for selecting a plurality of driving ratio changes for automobiles, a clutch pedal lever, primary and secondary selecting mechanisms, said primary mechanism including a plurality of selection controlling foot pressible portions selectively pressible for adjusting said primary mechanism to register for cooperative selection adjustment of said secondary mechanism during the operation of said pedal.

9. In a device for selecting a plurality of driving ratio changes for automobiles, a clutch pedal lever, primary and secondary selecting mechanisms, said primary mechanism including a plurality of selection controlling foot pressible portions selectively pressible for adjusting said primary mechanism to register for cooperative selection adjustment of said secondary mechanism during the operation of said pedal, and means controlled by the operation of said pedal to cause the selected ratio change to be effected.

10. In a driving ratio change device for automobiles, a pedal controller, and a ratio selection mechanism to select the ratio change, including selection initiating means mounted on and co-actuable with said controller and selectively settable selection means independent of said controller engageable and movable by said initiating means, both of said means being normally out of functional engagement, the movement of said controller bringing said means into functional engagement to complete the ratio selection.

11. In a driving ratio change device for automobiles, a clutch pedal lever associated with connections effecting the ratio change, and a ratio selection mechanism to select the ratio change, comprising selection initiating means movable with said lever, and selection completing means, both of said means being normally out of mutual engagement, the bodily movement of said lever causing functional engagement of said means to complete the ratio selection.

12. In a driving ratio change device for automobiles, a pedal controller with associated means operating the ratio change, ratio selection mechanism on said controller, including a single foot engageable selector member on said controller, said member having a single selector rod mounted so as to be movable into a plurality of ratio selective positions in a single plane of movement, and selection mechanism operable by said member.

13. In a driving ratio change device for an automobile, a clutch pedal lever adapted to operate the ratio change, and ratio change selecting means, including a foot contact pedal surface on said lever mounted immovably in respect thereto, further foot engageable definite ratio selector means movable in relation to said surface, said last means being pivoted on said lever for selective pivotal movement substantially in one and the same plane, and mechanism operated by said selector means.

14. In a device for selecting a plurality of driving ratio changes for automobiles, a clutch pedal lever, primary and secondary selecting mechanisms, said primary mechanism including selection controlling foot pressible parts selectively pressible for adjusting said primary mechanism to register in a plane substantially at right angles to the movement of the pedal lever for cooperative selection adjustment of said secondary mechanism during the operation of said pedal.

15. In an automobile ratio change device, a ratio selection mechanism comprising a pedal controller, a foot operable selector means mounted to move into a plurality of ratio selective positions in a single plane substantially transverse to the plane of movement of said controller, the foot operating said controller also selectively moving said selector means into said positions for ratio selections, and means cooperating with said selector during the movement of the pedal to complete the selection for the later control of the selected ratio change.

16. In an automobile ratio change device, a ratio selection mechanism including a clutch pedal controller, a foot operable selector means mounted for simple pivotal ratio selective movement in a plane substantially perpendicular to the plane of movement of said controller, and means cooperating therewith during the pedal movement to complete the selection, the foot operating said controller also selectively positioning said means for ratio selection.

17. In a speed control device, a pedal lever, a definite speed determining selector pivotally mounted on said pedal lever, a speed change rod movable by bodily movement of said pedal lever, and means normally independent of but operable by said selector to positively determine the speed change resultant of the movement of said speed change rod.

18. In a driving ratio change device for an automobile, a foot pedal controller or the like with associated connections to effect the ratio change and ratio change selection means, including a foot contact surface mounted on said controller immovably as to selection, foot engageable selection means movable into definite ratio selection position in respect to said surface, the foot operating said pedal controller also operating said foot engageable means, and other selection elements operated by said foot engageable means.

19. In a driving ratio change device, a foot operated controller with associated mechanism to effect the ratio change, and ratio change selecting means on said controller, including a pedal surface for operating said controller immovably mounted on said controller, foot engageable definite ratio selector means movable in respect to said pedal surface, the pressure engagement of the foot on said surface and on said selector means selectively determining the particular ratio selection, and selection setting means controlled by said selector means.

20. In a driving ratio change device, a foot pedal lever, and ratio change selecting mechanism, including a pedal surface for foot contact immovably mounted in respect to selection on said lever, mechanism having a plurality of foot engageable surfaces on said lever movable in relation to said pedal surface, the engagement of the foot selectively with said various surfaces controlling the operation of said mechanism to determine the definite ratio selection, and selection effecting mechanism operable by said first named mechanism.

21. In a speed change device for an automobile, a foot controller adapted to effect the speed change, and speed change selection means including a pedal surface for foot contact mounted on said controller immovably in respect to selection and selection mechanism having a plurality of foot engageable surfaces movable selectively in respect to said controller, the pressure of the foot selectively with any of said surfaces in substantially the same direction of motion determining the positioning of said mechanism for a particular speed selection, and operating said controller.

22. In a driving ratio change device for an automobile, a clutch pedal, and ratio selecting means including a foot contact plate mounted immovably on said pedal, and mechanism having a plurality of foot engageable selection surfaces mounted on said pedal and movable selectively in respect thereto, the substantially one direction of movement selectively on any of said surfaces positioning said mechanism for definite ratio selection and moving said pedal to operate the clutch.

23. In a driving ratio change device for an automobile, a foot operable controller with associated means to actuate the ratio change, ratio change selector means on said controller and including a pedal surface for foot contact immovably mounted in respect to selection on said controller, selection completing means, said ratio change selector means carrying a plurality of foot engageable surfaces movable in respect to said controller and positioned as spaced apart by said pedal surface, the pressure placement of the foot selectively on said surfaces determining the positioning of said selector means for selective cooperation with said selection completing means for effecting a definite ratio change upon movement of said controller.

24. In a driving ratio change device, a foot operated controller to control the ratio change, a ratio change selecting device actuated for a complete ratio selecting by the full depression of the controller, and ratio selector means on said controller, including a pedal surface for operating said controller mounted immovably as to selection on said controller, and foot engageable definite ratio selector means movable in respect to said pedal surface, the pressure engagement of the foot on said surface and on said selector means selectively determining the particular ratio selection.

25. In a driving ratio change device for an automobile, a foot pedal controller, and ratio selection mechanism, including a pedal surface for foot contact mounted on said controller immovably in respect to selection, a single foot engageable selector means mounted for pivotal movement on said controller, and a part positionable by said foot engageable selector means to cooperate therewith for ratio selection, the pressure engagement of the foot selectively with said pedal surface and said selector means determining the selective positioning of said part for definite ratio selection.

26. In a driving ratio change mechanism for an automobile, a foot operable lever or the like, and ratio selection means, including a pedal surface for foot contact mounted on said lever immovably in respect to selection and a single pivoted foot engageable ratio selector mechanism on said lever and having a plurality of selective foot contacts for diverse selection, the pressure placement of the foot selectively on said surface or said contacts controlling said mechanism for definite ratio selection, and means selectively positionable by said pressure placement for selective cooperation with said ratio selection means.

27. In a driving ratio change device for an automobile, a clutch pedal, foot operated mechanical ratio selection means, including a plurality of relatively movable foot engagement members on said pedal for selective foot engagement, the engagement portions of said members normally lying substantially in the same plane during the clutch engaged position of said pedal, and ratio selection mechanism selectively positionable by foot engagement of said members.

28. In a speed selection device, a pedal having a main contacting surface, a selector on said pedal, foot contact means on said selector, said contact means lying normally lower than the main surface of said pedal.

29. In a speed selection device, a pedal having a main contacting surface, a selector on said pedal, foot contact means on said selector, said contact means lying normally lower than the main surface of said pedal and being depressible for speed selection by the movement of the operator's foot in depressing the pedal.

30. In a speed selection device, a pedal having a main contacting surface, a selector on said pedal, foot contact means adapted to shift said selector, said contact means lying normally lower than the surface of said pedal, and means whereby depression of said pedal by contact with said pedal surface alone, without shifting said selector acts for determination of one of the speeds.

31. In a transmission control, a pedal, a selector on said pedal, speed selection mechanism adapted to be actuated by said selector, foot contact means on said selector, said contact means lying normally out of contact with the operator's foot on said pedal to prevent unintentional actuation of said selection mechanism, and means whereby depression of said contact is adapted to determine speed selection.

32. In a driving ratio change device for automobiles, a clutch pedal lever, and ratio determining means mounted on and movable with said lever, including foot contact surfaces on said means for ratio determining selective foot engagement mechanism operable by foot operation of said surfaces, and spring pressure means urging said mechanism automatically into a definite position of ratio selection.

33. In a transmission control, a pedal having a face, a selector mounted for operation with said pedal and having parts arranged for contact by the operator's foot upon the pedal face to direct said selector, a selecting mechanism, means for engaging the selecting mechanism to control the selection directed by said selector, and yielding means to direct said selector when there is no contact with said parts.

34. In a transmission control, a pedal having a face, a selector mounted for operation with said pedal and having parts arranged for contact by the operator's foot upon the pedal face to direct said selector, further speed selecting means, means for engaging the further speed selecting means to control the speed selection directed by said selector, and yielding means to direct the selection of an intermediate speed when there is no contact with said parts.

35. In a driving ratio change device for an automobile, foot operated mechanical ratio selection means, comprising a pedal lever or the like, a plurality of relatively movable foot engagement members on said lever for selective foot engagement, the engagement surfaces of said members being adapted and positioned in relation to each other to allow the foot to engage any two adjacent surfaces simultaneously at any time, and ratio selection mechanism operable selectively by the foot pressure on said members moving said lever.

36. A combined clutch operating and speed ratio selecting pedal comprising a foot placement part for controlling the pedal for clutch operation and for controlling the selection of a speed ratio, and a part arranged for selective positioning by cooperative foot placement on both of said parts, said placement controlling both of said parts for a plurality of selections and for clutch control.

37. A combined clutch operating and speed ratio selecting transmitting mechanism comprising a pedal having a foot placement part for controlling the pedal for clutch operation and for controlling the selection of a speed ratio, a part arranged for selective positioning by cooperative foot placement on both of said parts, said placement controlling both of said parts for a plurality of selections and for clutch control, and a transmitting means for transmitting the selection to a suitable ratio change mechanism.

38. A combined clutch operating and speed ratio selecting and speed change controlling pedal device including a part arranged for selective positioning, a transmitting means for communicating the selection to a suitable ratio change mechanism upon movement of said pedal, and a surface having relatively movable foot placement parts for positioning said first part and operating said pedal by foot contact on a duality of said foot placement parts.

39. A combined clutch operating and speed ratio selecting and speed change controlling device, including a part arranged for selective positioning, and relatively movable foot placement surface parts for positioning said part for selection and for operating said pedal by foot contact on a duality of said surface parts.

40. In a speed selection device, a pedal, a selector member mounted for operation with said pedal, selection directing means mounted for operation by said selector member, said selector member and selection directing mechanism being normally out of engagement and a speed change effecting member operable by said pedal independently of said selection directing mechanism.

41. In a ratio speed change device, a ratio selection mechanism comprising a pedal controller having a selectively immovable foot control part and co-acting with a plurality of relatively movable parts constructed for and relatively movable by diverse foot pressure engagement for diverse ratio selections, and selection means selectively determinable by said foot pressure on said parts, the relative arrangement of said parts and said means permitting only one selector setting at one time.

42. In a ratio speed change device a ratio selection mechanism comprising a pedal controller having a selectively immovable foot control part and a plurality of relatively movable parts constructed for and relatively movable by diverse foot pressure engagement for diverse ratio selections, selection means selectively settable by said foot pressure on said parts, and means for preventing more than one selection setting at one time.

43. In a speed selection device, a selector, a cam adapted for engagement by said selector, speed change directing means operable with said cam, and means locking said selector against further selective movement at the time of its initial engagement with said cam.

44. In a speed selection device, a selector, a cam adapted for engagement by said selector, speed change directing means operable with said cam, and means for locking said selector against further selective movement during its engagement with said cam.

45. In a transmission control, a pedal having a rigid contacting face, a selector attached to and operable with said pedal, operating portions of said selector extending through said pedal beyond the limits of said contacting face, and a shift rod operable by said selector.

46. In a transmission control, a normally free selector, a compound cam positioned for operative engagement by said selector, an arm operable with said cam, a speed change directing rod operable by said arm, and means for effecting the selected speed change.

47. In a speed selection device, a pedal, a selector mounted for operation with said pedal, a compound cam, a selection directing rod operable with said cam, and means for effecting engagement between said selector and said cam to move said cam into the selected position.

48. In a speed selection device, a pedal, a selector having its lower end forked mounted for operation with said pedal, a cam, a selection directing rod mounted for operation with said cam, and means to effect the engagement of said forked portion of said selector with said cam to effect a determined speed direction.

49. In a speed selection device, a pedal, a selector having its lower end forked mounted for operation with said pedal, a double face cam, a selection directing rod mounted for operation with said cam, and means to effect engagement between said forked portion of said selector and said double face cam to effect a determined speed direction.

50. In a speed selection device, a selector, a cam adapted for engagement by said selector, means operable with said cam to direct the selected speed change and separate means to positively effect any selected speed change.

51. In a speed selection device, a speed change directing cam, means for shifting said cam, speed change effecting mechanism, and an indicator and auxiliary control positively linked to said cam.

52. In a speed selection device, a multiple cam adapted to be placed in a plurality of positions, mechanism for positioning said cam, said mechanism being normally free therefrom, speed change directing means connected to and controlled by the position of said cam, and means for holding said cam in any determined position.

53. In a device for accomplishing a plurality of driving ratio changes for automobiles, a foot operable controller and a ratio selection mechanism, including a plurality of ratio determining selective foot pressure surfaces, operable for a plurality of ratio selections by the foot when operating said controller, selection means selectively operable by foot pressure on said surfaces, and additonal remote ratio selection means operable in other manner than said foot operation.

54. In a ratio change device for automobiles, a pedal controller with associated means to control the actuation of the ratio change, a ratio selection means selectively operable by the foot operating said pedal, and additional ratio selection controlling means operable by other than said foot operation, the ratio change selected being accomplished upon movement of said controller.

55. In a ratio speed change device, a ratio selection mechanism comprising a pedal, a ratio selection means selectively controllable by the foot operating said pedal, and additional means for controlling said selection, both of said selection controlling means alternatively operable for at least one selection.

56. The combination with a speed change device, of a ratio selecting mechanism comprising a pedal and associated means for controlling speed ratio selections by the foot operating said pedal, and alternative selection controlling means operable by other than foot control.

57. In a speed selection device, a speed change directing mechanism having five positions, a pedally operated selector adapted to engage with and actuate said speed change directing mechanism into three of said positions, and auxiliary manual control means for direction into the other of said positions.

58. In a device for accomplishing a plurality of driving ratio changes for automobiles, a clutch pedal lever, and a ratio selection mechanism including a selectively positionable means and a plurality of ratio selecting foot pressable portions selectively pressable for positioning said means for a plurality of ratio selections by the foot operating said lever, means for accomplishing a ratio change corresponding to a selection, and other ratio selection means arranged and positioned for hand operation.

59. In a device for accomplishing a plurality of driving ratio changes for automobiles, a clutch pedal associated with connections for effecting the ratio changes, a ratio selector mechanism associated with said pedal settable completely for definite ratio selection by the foot operating said pedal, additional ratio controlling means constructed and positioned for hand operation, and selection effecting means operable differently for different selections by both said mechanism and said controlling means.

60. In a ratio change device for automobiles, a clutch pedal controller with associated means to control the actuation of the ratio change, a ratio selection means selectively operable by the foot operating said pedal, and additional hand operated ratio selection controlling means, the ratio change selected being accomplished upon movement of said controller.

61. In a transmission control, a pedal, a speed selector on said pedal, further speed change selecting mechanism directable by said selector, and additional selector means apart from said pedal for directing reverse speed selection.

62. In a transmission control, a pedal, a speed selector on said pedal, speed change selecting mechanism operable by said selector, and manual control means for reverse speed selection.

63. In a speed selection device, a pedal selector, means operable by said selector to direct the selected speed change, and a remote indicator and auxiliary manual control positively operable with said selector.

64. In combination with a power transmission member having a plurality of relative speed positions, a speed selection device including, a pedal selector, means operable by said selector to direct certain speed changes, and an auxiliary control and indicator manually operable for direction of other speed changes.

65. In a speed selection device, a selector, speed change directing mechanism operable by said selector, and an indicator, said indicator being adaptable for use as manually operable means for speed selection upon removal of said selector.

66. In a speed selection device, a pedal, a speed selector member mounted on said pedal, speed change directing mechanism actuable by said selector, speed change effecting mechanism, and an auxiliary speed selector and indicator linked with said speed change directing mechanism and operative supplementarily to said pedal selector member.

In testimony whereof I hereunto affix my signature this 8th day of January, 1925.

BERNARD H. MOSSINGHOFF.